(12) United States Patent  
Noh

(10) Patent No.: US 8,059,169 B2  
(45) Date of Patent: Nov. 15, 2011

(54) APPARATUS AND METHOD FOR COMPENSATING COLOR, AND IMAGE PROCESSOR, DIGITAL PROCESSING APPARATUS, RECORDING MEDIUM USING IT

(75) Inventor: Yo-Hwan Noh, Gyeonggi-do (KR)

(73) Assignee: Mtekvision Co., Ltd., Seoul (KR)

( * ) Notice: Subject to any disclaimer, the term of this patent is extended or adjusted under 35 U.S.C. 154(b) by 603 days.

(21) Appl. No.: 12/300,309

(22) PCT Filed: May 25, 2007

(86) PCT No.: PCT/KR2007/002538  
§ 371 (c)(1),  
(2), (4) Date: Nov. 10, 2008

(87) PCT Pub. No.: WO2007/136234  
PCT Pub. Date: Nov. 29, 2007

(65) Prior Publication Data  
US 2009/0128670 A1  May 21, 2009

(30) Foreign Application Priority Data  
May 24, 2006 (KR) .......................... 10-2006-0046740

(51) Int. Cl.  
*H04N 5/217* (2006.01)  
(52) U.S. Cl. ...................................................... 348/234  
(58) Field of Classification Search .................. 348/234, 348/235, 236, 237, 222.1, 272, 246  
See application file for complete search history.

(56) References Cited

U.S. PATENT DOCUMENTS

| 7,034,872 | B1 | 4/2006 | Yamamoto |
| 7,580,070 | B2 * | 8/2009 | Yanof et al. .................... 348/246 |
| 7,683,948 | B2 * | 3/2010 | Yanof et al. .................... 348/246 |
| 2004/0247201 | A1 | 12/2004 | Arazaki |
| 2005/0013505 | A1 | 1/2005 | Nishimura et al. |

FOREIGN PATENT DOCUMENTS

| JP | 2003-18447 A | 1/2003 |
| JP | 2005-175913 A | 6/2005 |

* cited by examiner

*Primary Examiner* — Hung Dang  
(74) *Attorney, Agent, or Firm* — Birch, Stewart, Kolasch & Birch, LLP

(57) ABSTRACT

An aspect of the present invention features an apparatus for compensating color deviation of an image that has uneven color deviation. The apparatus can comprises: a color deviation analyzing module that analyzes luminance of each color component of each pixel composing the image and determines a color component having the highest or lowest rate of luminance change as an object color component, wherein the rate of luminance change is analyzed in the direction from a central pixel to a corner pixel of the image; a compensation table generating module that creates a plurality of sections from a beginning point, depending on a distance from the central pixel, and generates a compensation table for boundary pixels of each section with compensation values that are produced based on the luminance of the object color component; a compensation image generating module that generates a compensation image for the whole image, using the compensation table; and a compensating module that compensates the color deviation by applying the compensation image to the image.

25 Claims, 8 Drawing Sheets

Figure 5

| Quadrant | i | |
|---|---|---|
| Beginning point | A0 ($R_A$) | |
| Interval | a | |
| Compensation value | A0 | C0 |
| | A1 | C1 |
| | A2 | C2 |
| | ⋮ | ⋮ |
| | AN | CN |

APPARATUS AND METHOD FOR COMPENSATING COLOR, AND IMAGE PROCESSOR, DIGITAL PROCESSING APPARATUS, RECORDING MEDIUM USING IT

CROSS-REFERENCE TO RELATED APPLICATIONS

This application claims foreign priority benefits under 35 U.S.C. .sctn. 119(a)-(d) to PCT/KR2007/002538, filed May 25, 2007, which is hereby incorporated by reference in its entirety.

BACKGROUND

1. Technical Field

The present invention relates to an image sensor, more particularly to an apparatus and a method that can compensate color deviation occurred at corners of an image photographed by the image sensor.

2. Description of the Related Art

An image sensor refers to a semiconductor device converting an optical image to an electric signal. The image sensor includes a charge coupled device (CCD) and a complementary metal-oxide-silicon (CMOS) image sensor. The charge coupled device (CCD) has metal-oxide-silicon (MOS) capacitors disposed adjacent to each other and storing and transferring electric charge carriers. The complementary metal-oxide-silicon (CMOS) image sensor employs a CMOS technology, which uses a control circuit and a signal processing circuit as a peripheral circuit, to generate MOS transistors as many as the number of pixels and detect an output one by one from the MOS transistors.

Recently, portable devices having such an image sensor (e.g., digital cameras, mobile communication terminals, etc.) have been introduced in the market. The image sensor is composed of an array of photosensitive diodes called pixels or photosites. The pixel itself usually does not extract colors from light, but converts photons in a broad spectrum band into electrons.

In order to record color images by a single sensor, the sensor filters such that different pixels receive different colors. This type of sensor is known as a color filter array (CFA). Different color filters are arranged across the sensor according to a predefined pattern.

As a most common pattern, a Bayer pattern is widely employed in the CFA. In the Bayer pattern, a half of the total number of pixels is green (G), and each quarter of the total number is assigned to red (R) and blue (B). In order to obtain color information, red, green and blue filters are arranged in a particular sequence to form a repetitive pattern. The Bayer pattern is composed of a 2×2 array.

The Bayer pattern is based on the premise that the human eye derives most of the luminance data from the green light. Therefore, an image with a higher resolution can be generated when more of the pixels are made to be green, compared to the RGB color filter which alternates an equal number of red, green, and blue pixels.

The first element affecting directly on image quality of the image sensor is a lens, which focuses light onto the image sensor. The lens should focus the light exactly onto the image sensor, transmit a lager amount of photons equally on an image pickup device, and minimize difference of transmittance between components of the light to prevent color deviation between the colors.

But, portable apparatuses recently being developed and marketed are getting slimmer and more miniaturized which requires slimmer and smaller sensor modules. And, the demand for the image sensor having larger pixels in the portable apparatus is increased.

Accordingly, the lens cannot have enough distance with the image pickup device, and does not transmit the light effectively. And, the lens does not transmit the photons equally to the image pickup device.

Furthermore, as closer to the corners of the image pickup device, the amount of the light transmitted through the lens is reduced which causes significant color deviation so that an unexpected color is inserted into the overall image.

FIG. 1 is an example of color deviation occurred in each quadrant of a photographed image. When the image is divided into four quadrants I, II, III, IV as shown in FIG. 1, at least one or more of red, green and blue are strongly bulged out compared with the rest at the corners A, B, C, D of each quadrant which causes unevenness of the color deviation over the whole image.

Such an uneven color deviation further causes image distortion since not one color is bulged out in all 4 quadrants but a different color is bulged out at a different quadrant, for example red is bulged out at the A corner and blue at the C corner.

Even the beginning point, where the color deviation begins to become uneven, can be different in each quadrant. Since there are such differences in distances, RA for I, RB for II, RC for III, and RD for IV, between the center of the image and the beginning point at which the unevenness of the color deviation begins, in each quadrant, image distortion is also occurred.

The pixels in the central part and the pixels in the periphery of the CFA of the image sensor are exposed to a light source from different positions. These minute differences in position cause differences in illumination, and such differences in illumination affect color because of differences in light frequency and refractive index. Consequently, color distortion and reduction in signal amplitude dependant on the position of the pixels inevitably occur, degrading the quality of primitive images.

In order to overcome these problems has been introduced a method that equalizes the luminance in an image through compensating the lens shading phenomenon when photographing the image of a white area. But, the correction is processed centering on the center of the image and in a lump according to the distant from the center of the image.

SUMMARY

The present invention provides an apparatus and a method for compensating color deviation, and an image processor, a digital processing apparatus and recording medium using it that can improve uneven color deviation occurred in an image.

And, the present invention provides an apparatus and a method for compensating color deviation, and an image processor, a digital processing apparatus and recording medium using it that can diminish the image distortion due to color deviation corresponding to difference between properties of the colors in each corner of the image.

Other problems that the present invention solves will become more apparent through the following description.

An aspect of the present invention features an apparatus for compensating color deviation of an image that has uneven color deviation. The apparatus can comprises: a color deviation analyzing module that analyzes luminance of each color component of each pixel composing the image and determines a color component having the highest or lowest rate of luminance change as an object color component, wherein the rate of luminance change is analyzed in the direction from a central pixel to a corner pixel of the image; a compensation table generating module that creates a plurality of sections from a beginning point, depending on a distance from the central pixel, and generates a compensation table for boundary pixels of each section with compensation values that are produced based on the luminance of the object color component; a compensation image generating module that generates a compensation image for the whole image, using the compensation table; and a compensating module that compensates the color deviation by applying the compensation image to the image.

A beginning point creating module can designate a pixel of which luminance changes at a rate higher than a predetermined threshold value as the beginning point, wherein the rate of luminance change is analyzed for pixels on a reference line in the direction from the center pixel to the corner pixel.

The image can have the four corner pixels, and the compensation table generating module can generate a separate compensation table for each of four quadrants containing the each corner pixel.

The compensation table generating module can generate each compensation table with a different section interval for more than one of the quadrants.

The compensation table generating module can generate each compensation table with a different distance from the central pixel to the beginning point for more than one of the quadrants.

The compensation image generating module can interpolate linearly the boundary pixel and a compensation value of the boundary pixel stored in the compensation table, calculate compensation values of pixels except from the boundary pixels, and then, generate the compensation image based on the compensation values.

The compensation table can comprise a quadrant identifier for identifying a quadrant of which the color deviation is to be compensated, color information for the object color component, a beginning-point identifier for identifying the beginning point at which the color deviation begins to be compensated, interval information that informs a sectional interval of the compensation, and a compensation value table in which a compensation value of the boundary pixel of each section is recorded.

The compensation table can comprise a quadrant identifier for identifying a quadrant of which the color deviation is to be compensated, color information for the object color component, and a compensation value table in which a coordinate and a compensation value of the boundary pixel of each section is recorded.

Another aspect of the present invention features an image processor that can compensate uneven color deviation. The processor can comprises: a pre-processing part that color-interpolates and lens shading corrects inputted digital image signals and generates an image gamma-adjusted; a color-deviation compensating part that analyzes luminance of a color component of each pixel composing the image, determines a color component having the highest or lowest rate of luminance change in the direction from a central pixel to a corner pixel as an object color component, creates a plurality of sections from a beginning point corresponding to a distance from the central pixel, generates a compensation image for the whole image by using compensation values produced for a boundary pixel of each section on the basis of luminance of the object color component, and compensates the color deviation; and a post-processing part that processes image data outputted through the color deviation compensation part to be displayed.

The color deviation compensation part can comprises: a color deviation analyzing module that analyzes luminance of each color component of pixels composing the image and determines a color component having the highest or lowest rate of luminance change as an object color component, wherein the rate of luminance change is analyzed in the direction from a central pixel to a corner pixel of the image; a compensation table generating module that creates a plurality of sections from the beginning point, depending on a distance from the central pixel, and generates a compensation table for boundary pixels of each section by means of compensation values that are produced on the basis of luminance of the object color component; a compensation image generating module that generates a compensation image for the whole image, using the compensation table; and a compensating module that compensates the color deviation by applying the compensation image to the image.

The color deviation compensation part can further comprise a beginning point creating module that designates a pixel of which luminance changes at a rate higher than a predetermined threshold value as the beginning point, wherein the rate of luminance change is analyzed for pixels on a reference line from the center pixel to the corner pixel.

The image can have the four corner pixels, and the compensation table generating module can generate a separate compensation table for each of four quadrants containing the each corner pixel.

The compensation table generating module can generate each compensation table with a different section interval for more than one of the quadrants.

The compensation table generating module can generate each compensation table with a different distance from the central pixel to the beginning point for more than one of the quadrants.

The compensation image generating module can interpolate linearly the boundary pixel and a compensation value of the boundary pixel stored in the compensation table, calculate compensation values of pixels except from the boundary pixels, and then, generate the compensating image based on the compensation values.

The compensation table can include a quadrant identifier for identifying a quadrant of which the color deviation is to be compensated, color information for the object color component, a beginning-point identifier identifying the beginning point at which the color deviation begins to be compensated, interval information that informs a section interval of the compensation, and a compensation value table in which a compensation value of the boundary pixel of each section is recorded.

The compensation table can include a quadrant identifier for identifying a quadrant of which the color deviation is to be compensated, color information for the object color component, and a compensation value table in which a coordinate and a compensation value of the boundary pixel of each section is recorded.

Another aspect of the present invention features a digital processing apparatus that can compensate uneven color deviation. The apparatus comprises: a sensor unit that converts optical signals inputted through a lens into digital image signals, which are electrical signals, and outputs the digital image signals; an image processing unit that color-interpolates and lens shading corrects the inputted digital image signals, generates an image gamma-adjusted, analyzes luminance of a color component of each pixel composing the image, determines a color component having the highest or lowest rate of luminance change in the direction from a central pixel to a corner pixel as an object color component, creates a plurality of sections from a beginning point corresponding to a distance from the central pixel, generates a compensation image for the whole image by using compensation values produced for a boundary pixel of each section on the basis of luminance of the object color component, compensates the color deviation, and generates a conversion image converted in a format by which the conversion image can be displayed; and a display unit that displays the conversion image.

Another aspect of the present invention features a method for compensating uneven color deviation in an image. The method comprises: (a) analyzing luminance of each color component of pixels composing the image, and determining a color component having the highest or lowest rate of luminance change as an object color component, wherein the rate of luminance change is analyzed in the direction from a central pixel to a corner pixel of the image; (b) creating a plurality of sections from a beginning point, depending on a distance from the central pixel of the image; (c) producing compensation values for a boundary pixel of the section based on luminance of the object color component and storing the compensation values as a compensation table; (d) generating a compensation image for the whole image using the compensation table; and (e) compensating the color deviation by applying the compensation image to the image.

The method can further comprises designating a pixel of which luminance changes at a rate higher than a predetermined threshold value as the beginning point wherein the rate of luminance change is analyzed for pixels on a reference line from the center pixel to the corner pixel.

The method can further comprises generating a separate compensation table for four quadrants containing the each corner pixel by repeating the steps (b) and (c), wherein the image has the four corner pixels.

The step (b) can select different section intervals for more than one of the quadrants.

The step (c) can generate the compensation tables with different distances from the central pixel to the beginning points are generated for more than one of the quadrants.

The step (d) can further comprises: extracting the boundary pixel and a compensation value of the boundary pixel of each section, which is stored in the compensation table; determining a linear function corresponding to each section from the boundary pixel and a compensation value of the boundary pixel; and determining compensation values corresponding to pixels contained in each section by using the linear function.

Another aspect of the present invention features a recording medium in which a program of instructions that can be conducted by a digital processing apparatus is implemented visually for compensating uneven color deviation in an image, and that can be read by the digital processing apparatus. The program comprises: analyzing luminance of each color component of pixels composing the inputted image and determining a color component having the highest or lowest rate of luminance change as an object color component, wherein the rate of luminance change is analyzed in the direction from a central pixel to a corner pixel of the image; creating a plurality of sections from a beginning point, depending on a distance from the central pixel of the image; producing compensation values for a boundary pixel of the section based on luminance of the object color component and storing the compensation values as a compensation table; generating a compensation image for the whole image using the compensation table; and compensating the color deviation by applying the compensation image to the image.

BRIEF DESCRIPTION OF THE DRAWINGS

FIG. 5 is an example of a compensation table generated according to an embodiment of the present invention.

FIG. 9 is a flowchart illustrating a method of compensating the color deviation according to an embodiment of the present invention.

DETAILED DESCRIPTION

Hereinafter, embodiments of the present invention will be described in detail with reference to the accompanying drawings.

The descriptions set forth below merely illustrate the principles of the present invention. Therefore, those skilled in the art could devise various methods and apparatus thereof which realize the principles of the present invention and which do not depart from the spirit and scope of the present invention, even though they may not be clearly explained or illustrated in the present specification. Also, it is to be appreciated that not only the principles, viewpoints, and embodiments of the present invention, but all detailed descriptions listing the particular embodiments are intended to include structural and functional equivalents.

Terms used in the description (for example, a first, a second, etc.) are merely used to distinguish equal or similar items in an ordinal manner.

Also, the terms used in the description are merely used to describe the following embodiments, but not to limit the invention. Unless clearly used otherwise, expressions in the singular number include a plural meaning. In this application, the terms "included" and "stored" intend to express the existence of the characteristic, the numeral, the step, the operation, the element, the part, or the combination thereof, and do not intend to exclude another characteristic, numeral, step, operation, element, part, or any combination thereof, or any addition thereto.

Unless defined otherwise, the terms used herein including technological or scientific terms have the same meaning that is generally understood by those ordinarily skilled in the art to which the invention pertains. The terms used herein shall not be interpreted not only based on the definition of any dictionary but also the meaning that is used in the field to which the invention pertains. Also, unless clearly defined, the terms used herein shall not be interpreted too ideally or formally.

Figure 1:
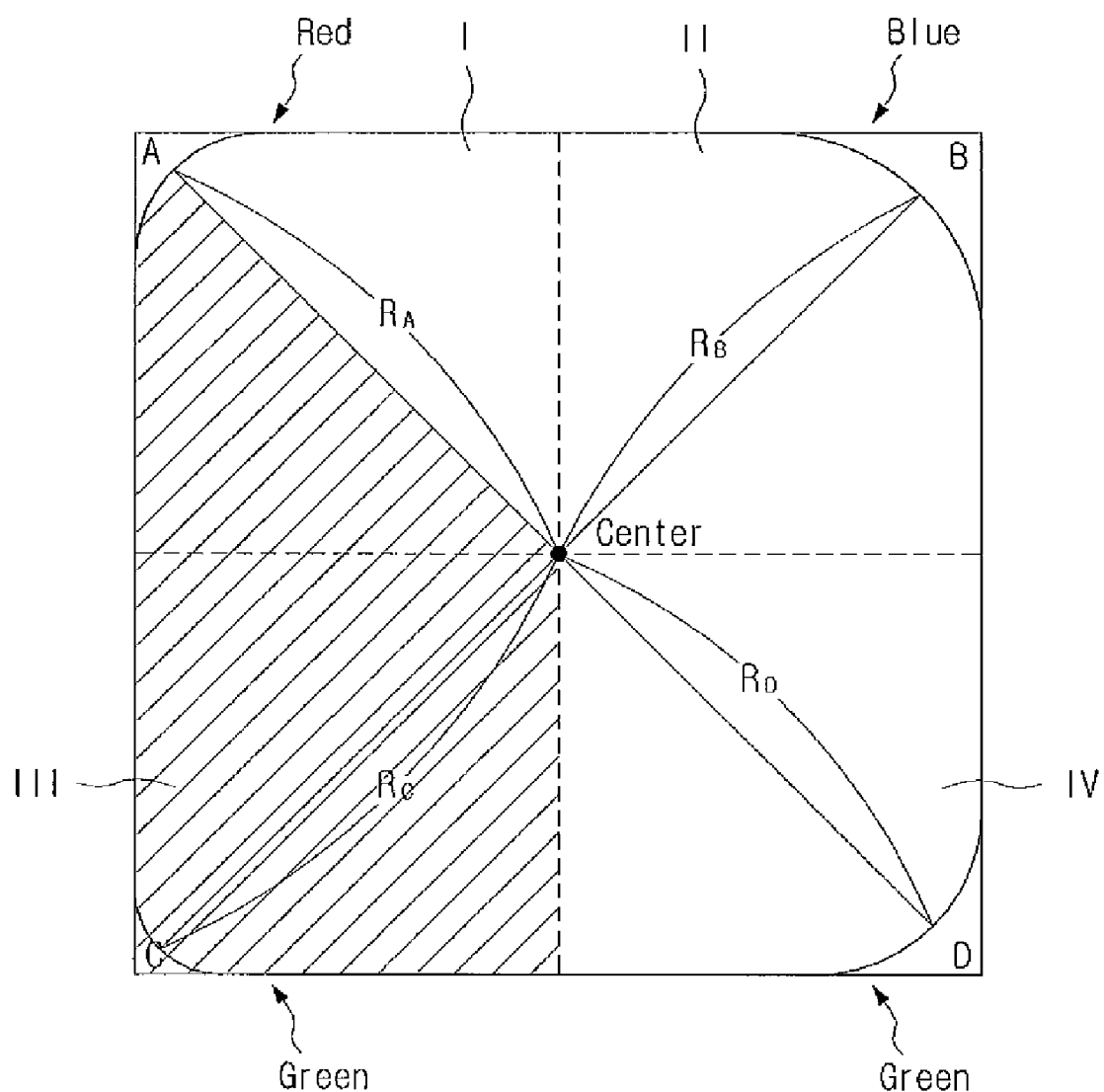
FIG. 1 is an example of color deviation occurred in each quadrant of a photographed image.

FIG. 1 is used as an example of an image with the uneven color deviation so as to require the compensation.

Figure 2:
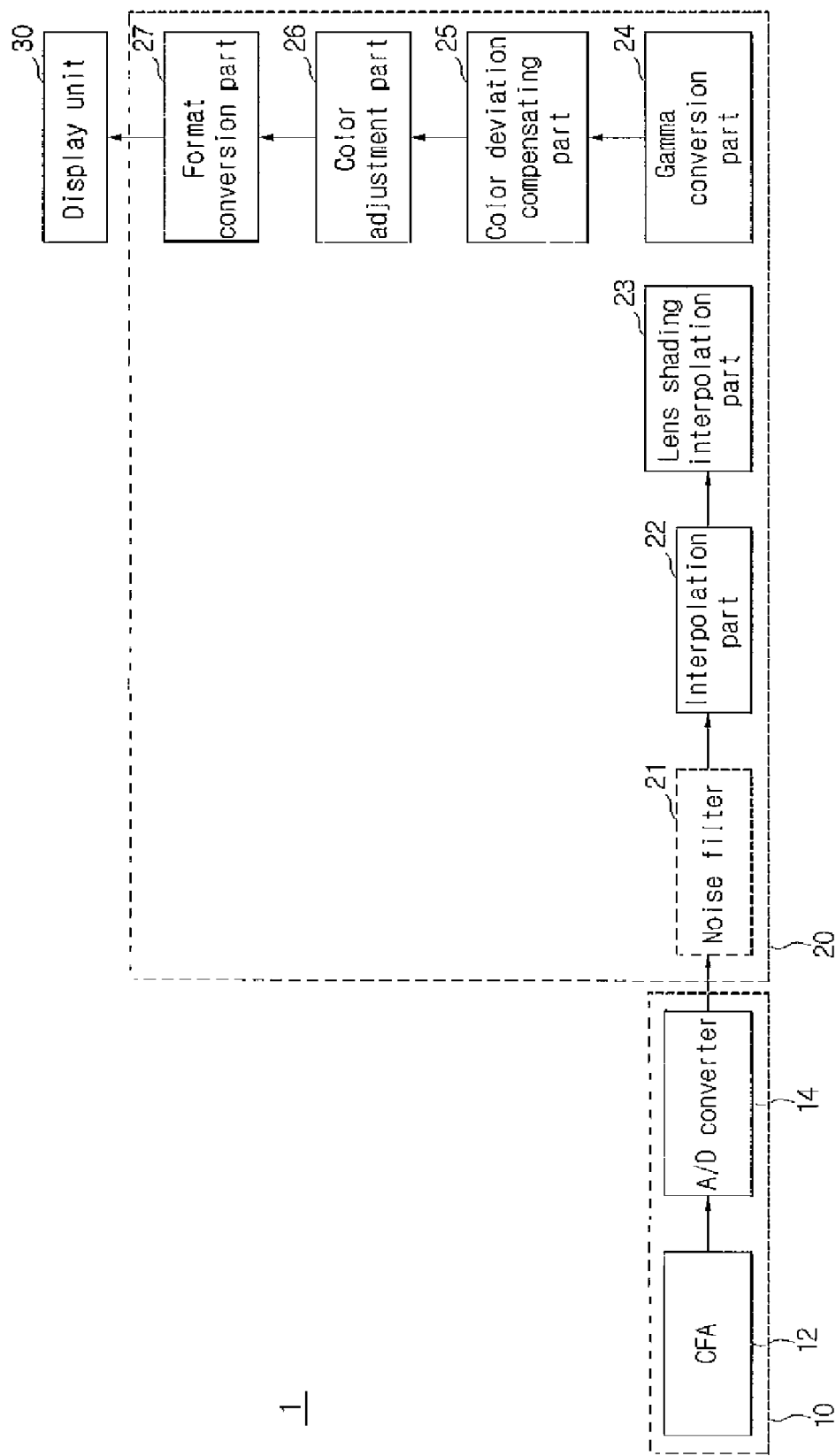
FIG. 2 is a block diagram showing the structure of an image processing apparatus according to an embodiment of the present invention.

FIG. 2 is a block diagram showing the structure of an image processing apparatus according to an embodiment of the present invention. Referring to FIG. 2 the image processing apparatus 1 includes a sensor unit 10, an image processing unit 20, and a display unit 30. Besides, a key input unit, a memory, etc. can also be included, but descriptions on them are omitted since they are irrelevant to the gist of the present invention.

The sensor unit 10 includes a color filter array (CFA) 12 and an A/D converter 14. The sensor unit 10 may further include a lens (not shown). The color filter array 12 converts optical signals inputted through an external lens into electrical signals, and outputs the electrical signals. At this time, the color filter array 12 can use a variety of patterns such as a Bayer pattern and an image signal containing chromatic information on only one of red, green and blue colors is outputted to each pixel. An image signal containing information on red color is outputted from the pixel corresponding to an R (red) pattern, an image signal containing information on green color is outputted from the pixel corresponding to a G (green) pattern, and an image signal containing information on blue color is outputted from the pixel corresponding to a B (blue) pattern.

Each pixel value obtained through the color filter array 12 having the Bayer pattern, etc. is interpolated (for example, deficit chromatic information can be inferred by averaging two pixel values of right and left sides, or four pixel values of neighboring four sides) to obtain complete chromatic information. Such an interpolation is conducted by an interpolation part 22 in the image processing unit 20.

The A/D converter 14 converts an image signal converted by the color filter array 12 into a digital signal, and sends the digital signal to the image processing unit 20.

The image processor 20 includes the interpolation part 22, a lens shading interpolation part 23, a gamma conversion part 24, a color-deviation compensating part 25, a color adjustment part 26, and a format conversion part 27. A noise filter 21 can be also included into the image processor 20.

The image processor 20 may further include a timing generating part (not shown) that generates a variety of timing signals out of a horizontal synchronizing signal (Hsync), a vertical synchronizing signal (Vsync), and a pixel clock (PCLK).

The noise filter 21 removes noise contained in the digital signal that the A/D converter 14 outputs. The noise filter 21 can be included in the image processor 20 if needed.

The interpolation part 22 generates pixel signals of red, green and blue colors for each pixel. When an image signal outputted from the color filter array 12 has the Bayer pattern, the pixel signals of green or blue cannot be obtained from the pixel corresponding to red color. Consequently, the interpolation part 21 generates the pixel signals of green and blue for the pixel corresponding to red color by performing an interpolating operation.

For this, the pixel signals of neighboring pixels are temporarily saved in a memory for interpolation (not shown), so that the interpolation part 22 uses these recorded pixel signals to perform the interpolating operation.

The tens shading compensation part 23 analyzes the luminance and level of the pixel signals for each pixel, detects a central pixel and a slope of the lens shading image, and produces a mask image that can compensate the lens shading phenomenon, in accordance with a predetermined process.

The compensation through the level analysis, lens shading image central pixel detection and slope detection is accomplished by setting an auto exposure value. The level relates to the luminance of each pixel, and, for example, when the levels of the pixels are all 10, the overall brightness of the picture can be said to be 10.

As described above, the lens shading compensation part 23 compensates image signals of all pixels in the pixel array corresponding to one frame, namely, the pixel signals containing information on red, green and blue colors, in accordance with the level set by setting the auto exposure value, thereby keeping the quality of a primitive image from deteriorating.

The gamma conversion part 24 converts image data to be appropriate for device characteristics (gamma characteristics) of the display unit 30 for output to the display unit (e.g. an LCD, a CRT) 30. In a gamma table (not shown) is stored a conversion table used for conversion to gamma characteristics.

The color-deviation compensating part 25 compensates the uneven color deviation of the image. That is, for the gamma characteristics-compensated image by the gamma conversion part 24, the color-deviation compensating part 25 generates a compensating image for compensating the unevenness of the color deviation occurred in each corner of the image as shown in FIG. 1 according to a predetermined method.

A structure and a function of the color-deviation compensating part 25 and a compensation method for the color deviation by means of the compensation image will be described in detail in reference to FIG. 3.

The color adjustment part 26 adjusts color tone, and the format conversion part 27 converts pixel signals to have a digital format such as NTSC, YUV, YCbCr, etc., and outputs them, as a means to convert pixel signals to have a format appropriate for the display unit 30. A format conversion table (not shown) is a table for conversion to display signal formats such as NTSC or TUN, etc.

Figure 3:
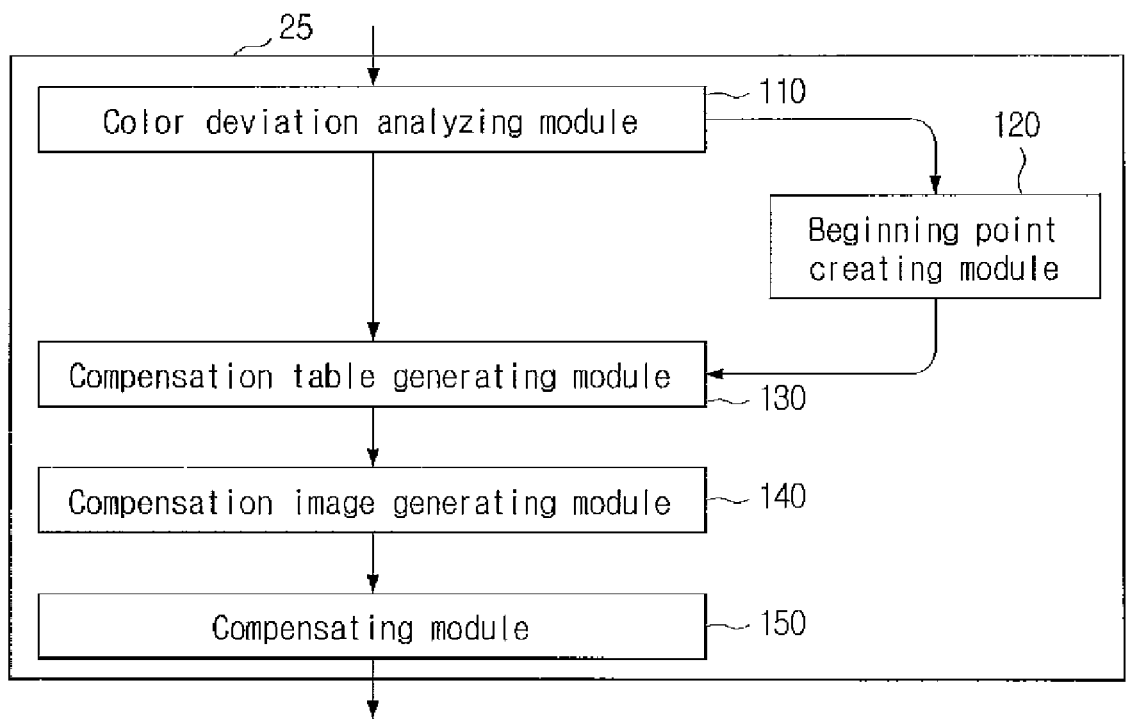
FIG. 3 is a block diagram of a color-deviation compensation part according to an embodiment of the present invention.
Figure 4:
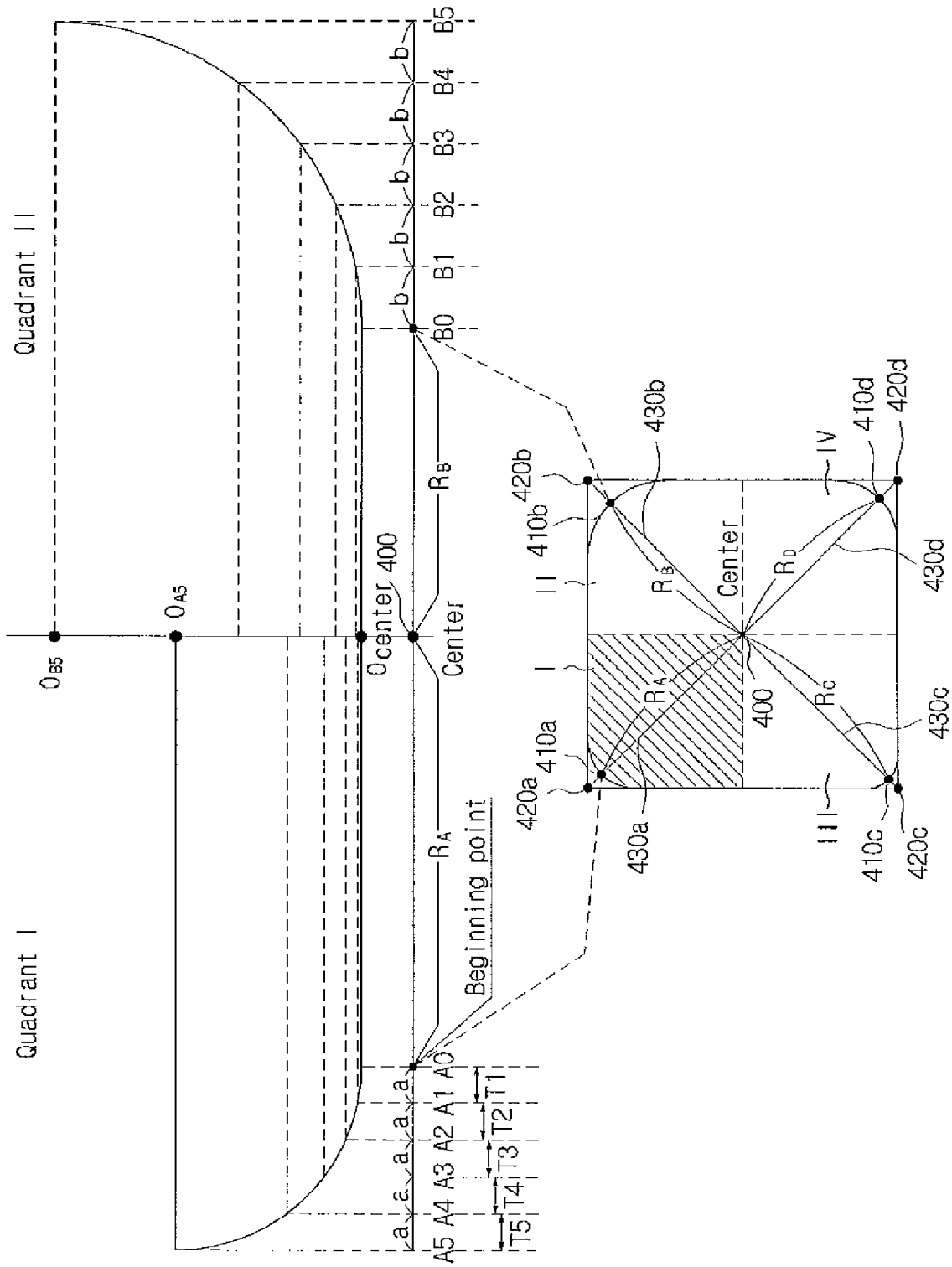
FIG. 4 illustrates a method of generating a compensation table according to an embodiment of the present invention.

FIG. 3 is a block diagram of a color-deviation compensating part 25 in accordance with an embodiment of the present invention. FIG. 4 illustrates a method of generating a compensation table according to an embodiment of the present invention, and FIG. 5 shows an example of the generated compensation table.

Figure 6:
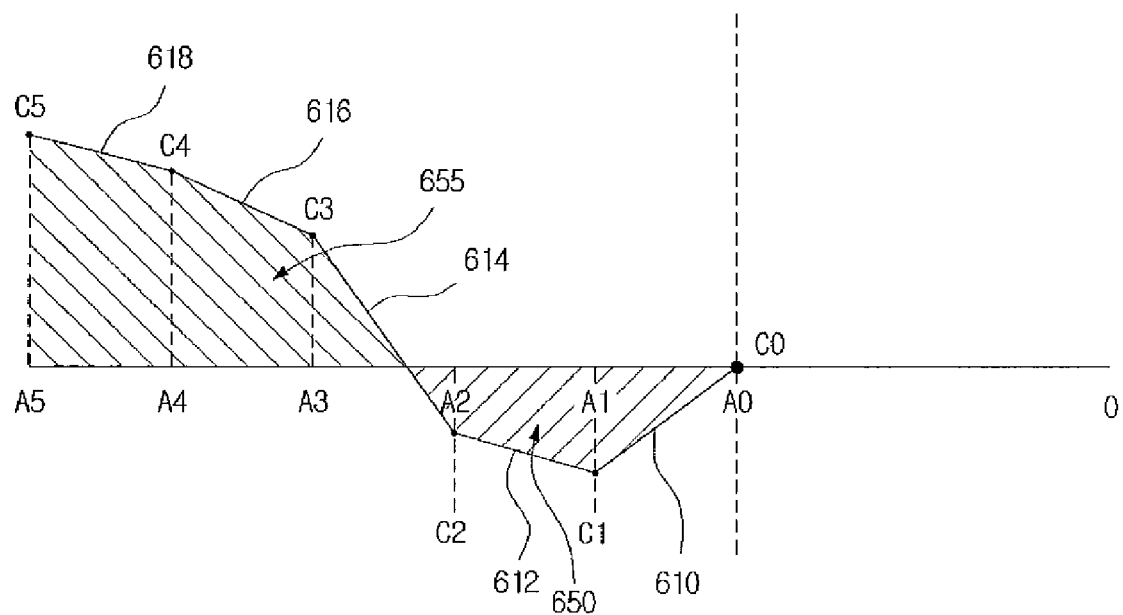
FIG. 6 is an example of a compensation curve obtained from the compensation table.
Figure 7:
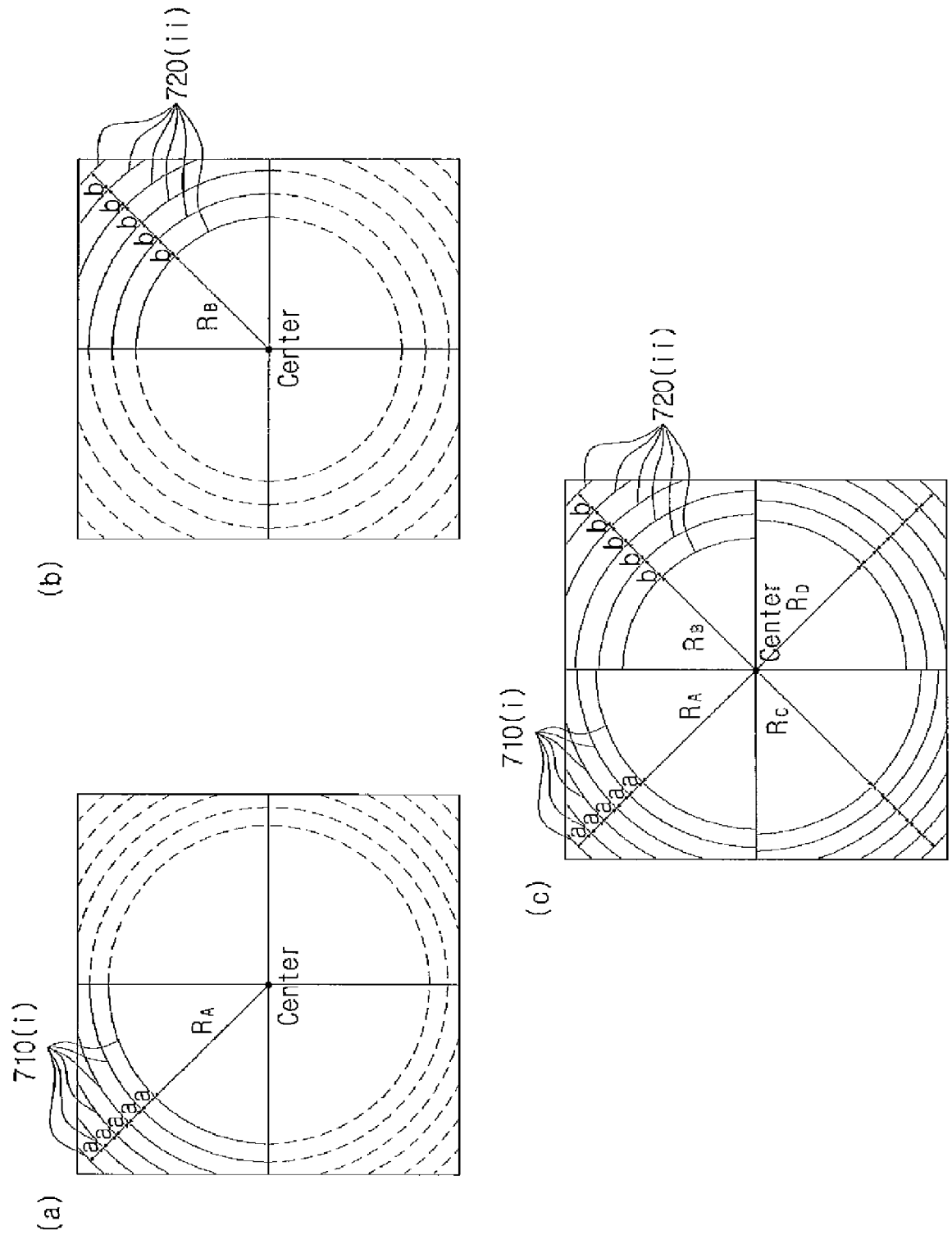
FIG. 7 is a plan view of compensating-images in each quadrant according to an embodiment of the present invention.

FIG. 6 shows a compensation curve obtained from the compensation table, and FIG. 7 is a plan view of compensation images in each quadrant according to the present invention.

Referring to FIG. 3, the color-deviation compensating part 25 includes a color-deviation analyzing module 110, a compensation table generating module 130, a compensation image generating module 140 and a compensating module 150. And, the color-deviation compensating part 25 may further include a beginning point creating module 120.

The color-deviation analyzing module 110 analyzes luminance of color components in each pixel of the image, which is composed of M×N pixels and is converted by the gamma conversion part 24. Here, the M is the number of pixels in a row, and the N is the number of pixels in a column.

Each pixel is composed of the color components of red, green and blue, and the color-deviation analyzing module 110 compares the rate of luminance change for each color component in the direction from the central pixel to the corner pixel of the image.

Here, a color component that has comparatively higher or lower rate of luminance change than the other two color components is determined as an object color component.

Since such a larger difference of the rate of luminance change of the object color component, compared to those of the other causes the color deviation in the corner of the image, it is for compensating the color deviation of the object color component.

The compensation table generating module 130 calculates a compensation value for compensating the color deviation, based on the luminance of the object color component of each pixel, which is analyzed by the color deviation analyzing module 110, and generates and stores the compensation table.

The compensation value refers to a value used for the object color component to have the same or similar rate of luminance change as the other color components.

And, in order to use time and memory effectively, the compensation table is produced by means of reference pixels and compensation values thereof, instead of all the pixels composing the image.

FIG. 4 illustrates a method of generating a compensation table according to an embodiment of the present invention.

Generally, four quadrants I, II, III, IV composing an image have different characteristics of the color deviation as described above. Therefore, a separate compensation table is generated for each quadrant where a corner pixel 420a, 420b, 420c, 420d is positioned. The corner pixel refers to a pixel at the corner of the image.

Hereinafter, the method of generating the compensation table for the quadrant I is described. A straight line from a central pixel 400 to a first corner pixel 420a in the quadrant I is decided as a first reference line 430a.

The characteristics of the color deviation are determined based on luminance of each pixel on the first reference line 430a. The color deviation analyzing module 110 can analyze the luminance just for the pixels on the first reference line 430a, as described above, not for the whole pixels in the image.

Among pixels on the first reference line 430a is determined a first beginning pixel 410a, where the luminance of the pixel begins to change. The first beginning pixel 410a is determined by a user or the beginning point creating module 120. In the case of determining by the user, the determination is performed through checking an image converted by the gamma conversion part 24 and then outputted on the screen by the display unit 30 and selecting a pixel on the first reference line 430a, where the unevenness of the color deviation begins as the first beginning point 410a.

One or more of beginning points can be selected for each quadrant. The first beginning point 410a is set by using the (x, y) coordinates in each quadrant or a distance RA from the central pixel 400 on the first reference line 430a.

Or, the first beginning point 410a is set by the beginning point creating module 120. The beginning point creating module 120 compares the luminance of pixels on the first reference line 430a one by one in the direction from the central pixel 400 to the first coiner pixel 420a.

And then, a pixel of which the luminance is greater than that of the previous pixel by a threshold value is designated as the first beginning point 410a. Here, the threshold value refers to a value for the rate of luminance change, which can be predetermined or controlled by the user.

The reason why to designate the beginning point is that the calculation is performed only for the pixels around each corner pixel 420a, 420b, 420c, 420d where the most color deviation is occurred, so that unnecessary calculation for the pixels around the central pixel 400 where the color deviation is hardly occurred is removed.

Accordingly, the calculation for compensating the color deviation is processed quickly, and the amount of the compensation table is decreased, thereby simplifying logic for generating the compensation table.

After the first beginning point 410a is set by the user or the beginning point creating module 120, pixels on the first reference line 430a from the first beginning point 410a to the first corner pixel 420a are divided into 2 or more than 2 sections by a constant interval. The section interval can be a variety number of pixels such as 32 pixels, 16 pixels, 8 pixels, etc., and is used as a base to generate the compensation table.

Referring to FIG. 4, as the first beginning point 410a is designated a point A0 that is the distance RA away from the central pixel 400 along the first reference line 430a, and A1, A2, A3, A4, A5, . . . , AN, which are pixels selected by an interval a from A0, are determined as boundary pixels of each section (T1, T2, T3, T4, T5, etc.). Here, the boundary pixels refer to pixels indicating the beginning and the end.

The compensation table stores compensation values used for compensating the color deviation of the first beginning point 420a, A0, and boundary pixels from A1 to AN. The compensation table is a type of lookup table, and an example thereof is shown in FIG. 5.

The compensation table includes quadrant identifiers, object color information, beginning point identifiers, section interval information and compensation value tables.

The quadrant identifier indicates a quadrant (one of I, II, III and IV) that can be compensated by a compensation table since each of 4 compensation tables can be generated independently for each quadrant.

The object color information is information on an object color component of which color deviation is to be compensated. Here, the object color information can be red, green, or blue.

The beginning point identifier indicates the beginning point 410a at which the color deviation compensation begins using the compensation table, and is recorded by using the (x, y) coordinates in each quadrant or the distance RA from the central pixel 400 to the beginning point 410a.

The section interval information indicates the interval of the compensation table, is expressed by a pixel unit, and is a in an embodiment of the preset invention.

In the compensation value table are sequentially recorded compensation values C0, C1, C2, . . . , CN used for the color deviation compensation of the boundary pixels A0, A1, A2, . . . , AN of each section determined from the beginning point 410a by using the interval of the section interval information.

Because the beginning point 410a and the section interval a are known, the coordinates of the boundary pixels A0, A1, A2, . . . , AN can be omitted.

Or, the compensation table can include the quadrant identifier, the object color information and the compensation value table on which the coordinates and compensation values of the boundary pixels of each section are recorded.

The beginning point 410a and the interval a are can be omitted because the compensation value table contains the coordinates of the boundary pixels.

The compensation image generating module 140 generates a compensation image for the whole quadrant I by using such a compensation table. The compensation table may further include color identifiers.

Since a color appeared more intense or fainter in each quadrant can be different, each quadrant can have a different compensation table corresponding to at least one of red, green and blue. In this case, each compensation table has a color identifier that can identify the color to be compensated.

Above description is focused on the quadrant I, but it is apparent that this method can be applied to the quadrants II, III, and IV.

Each beginning point 410a, 410b, 410c, 410d can be positioned at a distance RA, RB, RC, RD away from the central pixel 400, respectively, which can be same or different.

Also, an section interval of the compensation table for the quadrant I is a, that of the quadrant II is b, that of the quadrant III is c, and that of the quadrant IV is d, in which such section intervals may be same or different.

Furthermore, a separate compensation table may be generated corresponding to each color to be compensated in each quadrant, and each compensation table may have same or different section interval for each color.

The compensation image generating module 140 generates a compensation image for the overall pixels based on one or more compensation tables that are generated by the compensation table generating module 130.

A method of generating the compensation image is described in reference with FIG. 6. Here, the compensation table for generating the compensation image is referred to the compensation table in FIG. 5.

The compensation image for the quadrant I is obtained from the compensation values C0, C1, C2, C3, . . . of the beginning point A0 and the boundary pixels A1, A2, A3, . . . that are selected by the interval a from the beginning point A0.

First, boundary pixels for a first section are A0 and A1, and their compensation values are C0 and C1, respectively. Here, a first linear function 610 connecting the boundary pixels, C0 and C1 can be obtained.

And, compensation values for pixels included in the first section (that is, pixels between A0 and A1) can be obtained by the first linear function 610. Such a compensation method is called a linear interpolation.

Also, boundary pixels for a second section are A1 and A2, and compensation values for each boundary pixel are C1 and C2. A second linear function 612 connecting the compensation values, C1 and C2, can be obtained.

And, compensation values for pixels included in the second section (that is, pixels between A1 and A2) can be obtained by the second linear function 612.

A third linear function 614, a fourth linear function 616, a fifth linear function 618, etc. can be obtained by applying the method as described above, to each section repeatedly, and thus compensation values for not only boundary pixels but also the other pixels of each section can be obtained by the linear functions.

Compensation values for pixels between the central pixel 0 and the beginning point A0 are designated as a first value (for example, '0' or '1'), representing that the compensation is not needed, or as C0 the same compensation value of the beginning point A0.

The compensation values for all the pixels on the first reference line 430*a* are obtained by the method as described above and the compensation values for the other pixels, except those on the first reference line 430*a*, are obtained by assigning the same compensation values for the pixel having the same distance away from the central pixel 400 on the reference line 430*a*.

That is, all pixels 710(*i*) on a circle with the same radius from the central pixel 400 have the same compensation value as shown in FIG. 7 (*a*).

The compensation image is formed by concentric circles with a common center of the central pixel 400 such that the color deviation is compensated more naturally and accurately corresponding to the property of the lens.

And, compensation images are independently generated by using separate compensation tables for each quadrant (referring to FIGS. 7 (*b*) and (*c*)) so that the compensation is performed separately for each quadrant and in more detail.

The compensating module 150 compensates the color deviation by applying the compensation image generated by the compensation image generating module 140 to the image inputted into the color deviation compensating part 25.

For example, when the compensation image is lower than the reference value 650, the color deviation is compensated by subtracting the compensation image from the inputted image. And, the compensation image is added to the inputted image when the compensation image is higher than the reference value 655.

Figure 8:
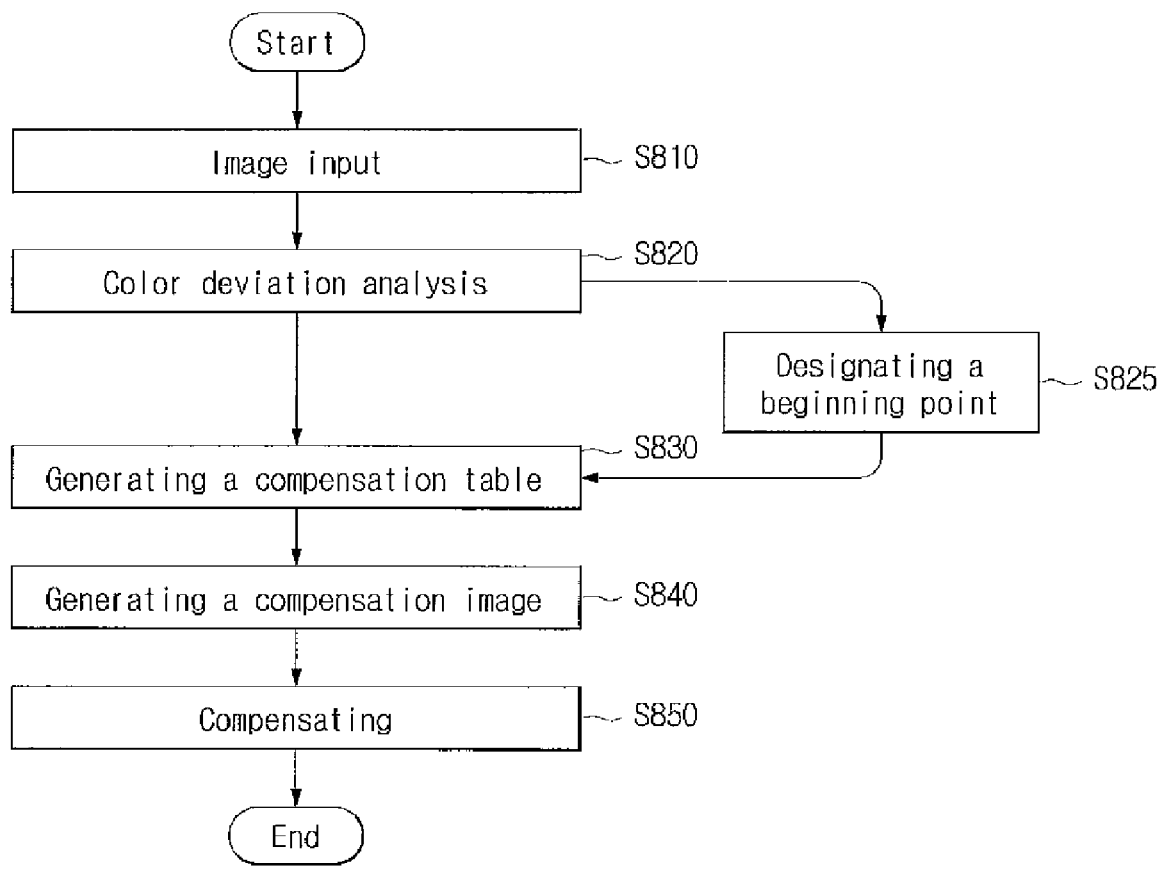

FIG. 8 is a flowchart illustrating a method of compensating the color deviation according to an embodiment of the present invention.

Referring to FIG. 8, at the step S810, the color deviation compensating part 25 is inputted an image preprocessed through the noise filtering, the lens shading compensation, the gamma conversion, and so on.

At the step S820, the color deviation analyzing module 110 analyzes luminance of each pixel in the inputted image. Here, the analysis is performed for all the pixels in the image or for pixels only on the reference lines 430*a*, 430*b*, 430*c*, 430*d* (hereinafter referred to as 430).

At the step S380, the compensation table generating module 130 calculates the compensation values for the boundary pixels spaced apart by the predetermined interval based on the luminance analyzed by the color deviation analyzing module 110, and generates the compensation table that is a reference table including the coordinates of the boundary pixels or the distances between the central pixel 400 and the boundary pixels and the compensation values.

The compensation table may be generated independently corresponding to each quadrant or for one or more of red, green and blue colors.

At the step S840, the compensation image generating module 140 generates the compensation image for the whole pixels on all reference lines 430 and the whole pixels on the all quadrants, through the linear interpolation based on the one or more compensation tables.

Here, the compensation image is formed by concentric circles with the common center of the central pixel 400.

At the step S850, the compensating module 150 compensates the color deviation by applying the compensation image to the inputted image. The compensation can be performed by multiplying, adding, subtracting, etc., to the inputted image according to the property of the compensation image.

If the compensation table is generated for the whole pixels in the image, unnecessary operation is conducted for pixels around the central pixel 400, where the compensation is not required, the volume of the compensation table increases, and logic for generating the compensation table becomes complicated.

Consequently, the step S825, which is the step of designating the beginning points 410*a*, 410*b*, 410*c*, 410*d* (hereinafter referred to as 410), is inserted between the steps S820 and S830, so that the process of generating the compensation table is performed from the beginning point 410, thereby removing the unnecessary operation, reducing the volume of the compensation table and simplifying the logic for the compensation table.

The beginning point can be designated by the user or the beginning point creating module 120. In the case of selecting the beginning point by the beginning point creating module 120, luminance of pixels on the reference line 430 is sequentially compared from the central pixel 400, and a pixel of which luminance is changed greater than the threshold value is determined as the beginning point 410.

According to another embodiment of the present invention, the color-deviation compensating part 25 can be a recording medium where a program for performing the steps from S810 to S850 as described above is recorded.

An apparatus and a method for compensating color deviation, and an image processor, a digital processing apparatus, and a recording medium using it, according to the present invention, can improve the unevenness of the color deviation occurred in an image.

In particular, it is possible to reduce distortions occurring at each corner of the image because of differences in color due to differences in property for each color.

In addition, a separate compensation table can be applied for each quadrant of an image for elaborate compensation, and the beginning points can be configured so that unnecessary computations can be omitted and compensation operations can be performed quickly, whereby the storage region for creating compensation tables can be decreased, and the logic for creating the compensation tables can be simplified.

While the invention has been described with reference to the disclosed embodiments, it is to be appreciated that those skilled in the art can change or modify the embodiments without departing from the scope and spirit of the invention or its equivalents as stated below in the claims.

What is claimed is:

1. An apparatus for compensating color deviation of an image that has uneven color deviation, the apparatus comprising:
   a color deviation analyzing module that analyzes luminance of each color component of each pixel composing the image and determines a color component having the highest or lowest rate of luminance change as an object color component, wherein the rate of luminance change is analyzed in the direction from a central pixel to a corner pixel of the image;
   a compensation table generating module that creates a plurality of sections from a beginning point, depending on a distance from the central pixel, and generates a compensation table for boundary pixels of each section with compensation values that are produced based on the luminance of the object color component;
   a compensation image generating module that generates a compensation image for the whole image, using the compensation table; and
   a compensating module that compensates the color deviation by applying the compensation image to the image.

2. The apparatus of claim 1, further comprising a beginning point creating module that designates a pixel of which luminance changes at a rate higher than a predetermined threshold value as the beginning point, wherein the rate of luminance change is analyzed for pixels on a reference line in the direction from the center pixel to the corner pixel.

3. The apparatus of claim 1, wherein the image has the four corner pixels, and the compensation table generating module generates a separate compensation table for each of four quadrants containing the each corner pixel.

4. The apparatus of claim 3, wherein the compensation table generating module generates each compensation table with a different section interval for more than one of the quadrants.

5. The apparatus of claim 3, wherein the compensation table generating module generates each compensation table with a different distance from the central pixel to the beginning point for more than one of the quadrants.

6. The apparatus of claim 1, wherein the compensation image generating module interpolates linearly the boundary pixel and a compensation value of the boundary pixel stored in the compensation table, calculates compensation values of pixels except from the boundary pixels, and then, generates the compensation image based on the compensation values.

7. The apparatus of claim 1, wherein the compensation table comprises a quadrant identifier for identifying a quadrant of which the color deviation is to be compensated, color information for the object color component, a beginning-point identifier for identifying the beginning point at which the color deviation begins to be compensated, interval information that informs a sectional interval of the compensation, and a compensation value table in which a compensation value of the boundary pixel of each section is recorded.

8. The apparatus of claim 1, wherein the compensation table comprises a quadrant identifier for identifying a quadrant of which the color deviation is to be compensated, color information for the object color component, and a compensation value table in which a coordinate and a compensation value of the boundary pixel of each section is recorded.

9. An image processor that compensates uneven color deviation, the processor comprising:
   a pre-processing part that color-interpolates and lens shading corrects inputted digital image signals and generates an image gamma-adjusted;
   a color-deviation compensating part that analyzes luminance of a color component of each pixel composing the image, determines a color component having the highest or lowest rate of luminance change in the direction from a central pixel to a corner pixel as an object color component, creates a plurality of sections from a beginning point corresponding to a distance from the central pixel, generates a compensation image for the whole image by using compensation values produced for a boundary pixel of each section on the basis of luminance of the object color component, and compensates the color deviation; and
   a post-processing part that processes image data outputted through the color deviation compensation part to be displayed.

10. The image processor of claim 9, wherein the color deviation compensation part comprises:
    a color deviation analyzing module that analyzes luminance of each color component of pixels composing the image and determines a color component having the highest or lowest rate of luminance change as an object color component, wherein the rate of luminance change is analyzed in the direction from a central pixel to a corner pixel of the image;
    a compensation table generating module that creates a plurality of sections from the beginning point, depending on a distance from the central pixel, and generates a compensation table for boundary pixels of each section by means of compensation values that are produced on the basis of luminance of the object color component;
    a compensation image generating module that generates a compensation image for the whole image, using the compensation table; and
    a compensating module that compensates the color deviation by applying the compensation image to the image.

11. The image processor of claim 10, wherein the color deviation compensation part further comprises a beginning point creating module that designates a pixel of which luminance changes at a rate higher than a predetermined threshold value as the beginning point, wherein the rate of luminance change is analyzed for pixels on a reference line from the center pixel to the corner pixel.

12. The image processor of claim 10, wherein the image has the four corner pixels, and the compensation table generating module generates a separate compensation table for each of four quadrants containing the each corner pixel.

13. The image processor of claim 12, wherein the compensation table generating module generates each compensation table with a different section interval for more than one of the quadrants.

14. The image processor of claim 12, wherein the compensation table generating module generates each compensation table with a different distance from the central pixel to the beginning point for more than one of the quadrants.

15. The image processor of claim 10, wherein the compensation image generating module interpolates linearly the boundary pixel and a compensation value of the boundary pixel stored in the compensation table, calculates compensation values of pixels except from the boundary pixels, and then, generates the compensating image based on the compensation values.

16. The image processor of claim 10, wherein the compensation table includes a quadrant identifier for identifying a quadrant of which the color deviation is to be compensated, color information for the object color component, a beginning-point identifier identifying the beginning point at which the color deviation begins to be compensated, interval information that informs a section interval of the compensation, and a compensation value table in which a compensation value of the boundary pixel of each section is recorded.

17. The processor of claim 10, wherein the compensation table includes a quadrant identifier for identifying a quadrant of which the color deviation is to be compensated, color information for the object color component, and a compensation value table in which a coordinate and a compensation value of the boundary pixel of each section is recorded.

18. A digital processing apparatus that compensates uneven color deviation, the apparatus comprising:
   a sensor unit that converts optical signals inputted through a lens into digital image signals, which are electrical signals, and outputs the digital image signals;
   an image processing unit that color-interpolates and lens shading corrects the inputted digital image signals, generates an image gamma-adjusted, analyzes luminance of a color component of each pixel composing the image, determines a color component having the highest or lowest rate of luminance change in the direction from a central pixel to a corner pixel as an object color component, creates a plurality of sections from a beginning point corresponding to a distance from the central pixel, generates a compensation image for the whole image by using compensation values produced for a boundary pixel of each section on the basis of luminance of the object color component, compensates the color deviation, and generates a conversion image converted in a format by which the conversion image can be displayed; and
   a display unit that displays the conversion image.

19. A method for compensating uneven color deviation in an image, the method comprising:
   (a) analyzing luminance of each color component of pixels composing the image, and determining a color component having the highest or lowest rate of luminance change as an object color component, wherein the rate of luminance change is analyzed in the direction from a central pixel to a corner pixel of the image;
   (b) creating a plurality of sections from a beginning point, depending on a distance from the central pixel of the image;
   (c) producing compensation values for a boundary pixel of the section based on luminance of the object color component and storing the compensation values as a compensation table;
   (d) generating a compensation image for the whole image using the compensation table; and
   (e) compensating the color deviation by applying the compensation image to the image.

20. The method of claim 19, between (a) and (b) further comprising designating a pixel of which luminance changes at a rate higher than a predetermined threshold value as the beginning point, wherein the rate of luminance change is analyzed for pixels on a reference line from the center pixel to the corner pixel.

21. The method of claim 19, between (c) and (d) further comprising generating a separate compensation table for four quadrants containing the each corner pixel by repeating the steps (b) and (c), wherein the image has the four corner pixels.

22. The method of claim 21, wherein the step (b) selects different section intervals for more than one of the quadrants.

23. The method of claim 21, wherein the step (c) generates the compensation tables with different distances from the central pixel to the beginning points are generated for more than one of the quadrants.

24. The method of claim 19, wherein the step (d) further comprises:
   extracting the boundary pixel and a compensation value of the boundary pixel of each section, which is stored in the compensation table;
   determining a linear function corresponding to each section from the boundary pixel and a compensation value of the boundary pixel; and
   determining compensation values corresponding to pixels contained in each section by using the linear function.

25. A recording medium in which a program of instructions that can be conducted by a digital processing apparatus is implemented visually for compensating uneven color deviation in an image, and that can be read by the digital processing apparatus, the program comprising:
   analyzing luminance of each color component of pixels composing the inputted image and determining a color component having the highest or lowest rate of luminance change as an object color component, wherein the rate of luminance change is analyzed in the direction from a central pixel to a corner pixel of the image;
   creating a plurality of sections from a beginning point, depending on a distance from the central pixel of the image;
   producing compensation values for a boundary pixel of the section based on luminance of the object color component and storing the compensation values as a compensation table;
   generating a compensation image for the whole image using the compensation table; and compensating the color deviation by applying the compensation image to the image.

* * * * *